(12) United States Patent
Yorifuji

(10) Patent No.: US 12,411,021 B2
(45) Date of Patent: Sep. 9, 2025

(54) MAP MANAGEMENT APPARATUS

(71) Applicant: TOYOTA JIDOSHA KABUSHIKI KAISHA, Toyota (JP)

(72) Inventor: Yamato Yorifuji, Aichi-gun Aichi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 112 days.

(21) Appl. No.: 18/524,775

(22) Filed: Nov. 30, 2023

(65) Prior Publication Data

US 2024/0192020 A1 Jun. 13, 2024

(30) Foreign Application Priority Data

Dec. 9, 2022 (JP) ................. 2022-196897

(51) Int. Cl.
| | | |
|---|---|---|
| *G01C 21/30* | (2006.01) | |
| *B60W 40/06* | (2012.01) | |
| *B60W 40/10* | (2012.01) | |
| *B60W 40/105* | (2012.01) | |
| *B60W 50/14* | (2020.01) | |

(Continued)

(52) U.S. Cl.
CPC ......... *G01C 21/3819* (2020.08); *B60W 40/06* (2013.01); *B60W 40/105* (2013.01); *B60W 50/14* (2013.01); *G01C 21/3833* (2020.08); *G06V 20/582* (2022.01); *G06V 20/588* (2022.01); *B60W 2050/146* (2013.01); *B60W 2420/403* (2013.01); *B60W 2552/05* (2020.02); *B60W 2555/60* (2020.02); *B60W 2556/40* (2020.02)

(58) Field of Classification Search
CPC ..... B60W 2050/146; B60W 2420/403; B60W 2552/05; B60W 2555/60; B60W 2556/40; B60W 40/06; B60W 40/105; B60W 50/14; G01C 21/3819; G01C 21/3822; G01C 21/3833; G01C 21/3848; G06V 20/582; G06V 20/588

See application file for complete search history.

(56) References Cited

U.S. PATENT DOCUMENTS

| 8,355,851 B2 | 1/2013 | Inoue et al. |
|---|---|---|
| 8,370,040 B2 | 2/2013 | Inoue et al. |

(Continued)

FOREIGN PATENT DOCUMENTS

JP 2013-108820 A 6/2013

*Primary Examiner* — Tyler J Lee
(74) *Attorney, Agent, or Firm* — Dinsmore & Shohl LLP

(57) ABSTRACT

A map management apparatus includes an image recognition unit that recognizes at least any one of a road shape, a road type, and a speed sign on the basis of a captured image of an in-vehicle camera, a recognition determination unit that determines whether or not there is a difference between the recognized recognition information and map information, a vehicle speed determination unit that determines whether or not there is a difference between a speed of an own vehicle and speed sign information included in the map information, and a notification unit that issues a notification for prompting update of the map information when the number of times when the recognition determination unit determines that there is the difference and the vehicle speed determination unit determines that there is the difference becomes equal to or more than a determination frequency threshold.

6 Claims, 3 Drawing Sheets

(51) Int. Cl.
 *G01C 21/00* (2006.01)
 *G06V 20/56* (2022.01)
 *G06V 20/58* (2022.01)

(56) References Cited

U.S. PATENT DOCUMENTS

| | | |
|---|---|---|
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,399,567 B2 * | 9/2019 | Yamashita ............ B60W 50/14 |
| 10,486,698 B2 | 11/2019 | Masui et al. |
| 2012/0253628 A1 * | 10/2012 | Maruyama .......... B60W 50/085 |
| | | 701/93 |
| 2018/0079410 A1 * | 3/2018 | Yamashita .......... B60W 30/146 |
| 2019/0295419 A1 | 9/2019 | Tosa et al. |

* cited by examiner

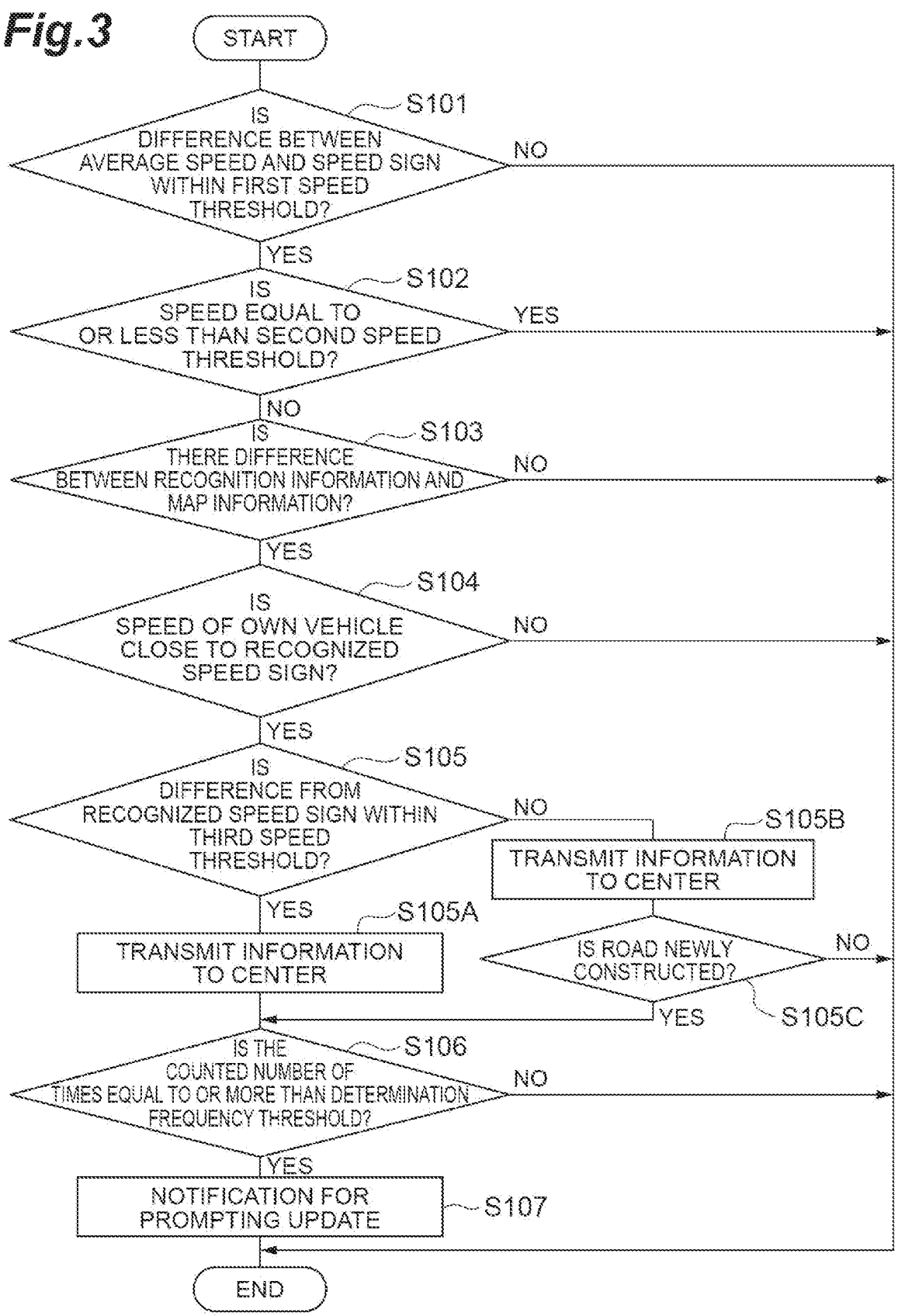

MAP MANAGEMENT APPARATUS

CROSS-REFERENCE TO RELATED APPLICATION

This application claims the benefit of priority from Japanese Patent Application No. 2022-196897, filed on Dec. 9, 2022, the entire contents of which are incorporated herein by reference.

TECHNICAL FIELD

The present disclosure relates to a map management apparatus that issues a notification for prompting update of map information stored in an in-vehicle device.

BACKGROUND

Map information stored in an in-vehicle device may be different from an actual situation due to new construction of a road or the like after a certain period elapses. Therefore, for example, Japanese Unexamined Patent Publication No. 2013-108820 describes that a notification for prompting update of the map information is issued, on the basis of a difference between a recognition result of a sign provided on the road and sign information of the map information, or the like.

SUMMARY

For example, even if the recognition result of the road sign includes an error, a device described in Japanese Unexamined Patent Publication No. 2013-108820 may determine that there is the difference between the recognition result of the road sign and the sign information of the map information. Therefore, the present disclosure describes a map management apparatus that can accurately determine whether or not it is necessary to update map information and issue a notification for prompting the update.

One aspect of the present disclosure is a map management apparatus that includes road information including a road shape and a road type and speed sign information and issues a notification for prompting update of map information stored in an in-vehicle device of an own vehicle, and the map management apparatus includes a recognition unit that recognizes at least any one of a road shape of a road where the own vehicle travels, a road type of the road where the own vehicle travels, and a speed sign provided on the road where the own vehicle travels, on the basis of a captured image of an in-vehicle camera that images surroundings of the own vehicle, a first determination unit that determines whether or not there is a difference between recognition information including information regarding at least any one of the road shape, the road type, and the speed sign recognized by the recognition unit and the map information, a second determination unit that determines whether or not there is a difference between a speed of the own vehicle and the speed sign information included in the map information, and a notification unit that issues a notification for prompting update of the map information, when the number of times when the first determination unit determines that there is the difference and the second determination unit determines that there is the difference becomes equal to or more than a predetermined determination frequency threshold.

In the map management apparatus, the recognition unit recognizes at least the speed sign on the basis of the captured image, and when the speed of the own vehicle is closer to a speed indicated by the speed sign recognized by the recognition unit than a speed indicated by the speed sign information included in the map information, the second determination unit may determine that there is a difference between the speed of the own vehicle and the speed sign information included in the map information.

In the map management apparatus, when a difference between the speed of the own vehicle and the speed indicated by the speed sign recognized by the recognition unit exceeds a predetermined third speed threshold, even when the speed of the own vehicle is closer to the speed indicated by the speed sign recognized by the recognition unit than the speed indicated by the speed sign information, the second determination unit does not need to determine that there is a difference between the speed of the own vehicle and the speed sign information included in the map information.

According to one aspect of the present disclosure, it is possible to accurately determine whether or not it is necessary to update map information and issue a notification for prompting the update.

BRIEF DESCRIPTION OF THE DRAWINGS

FIG. 3 is a flowchart illustrating a flow of update notification processing of map information according to a modification.

DETAILED DESCRIPTION

Figure 1:
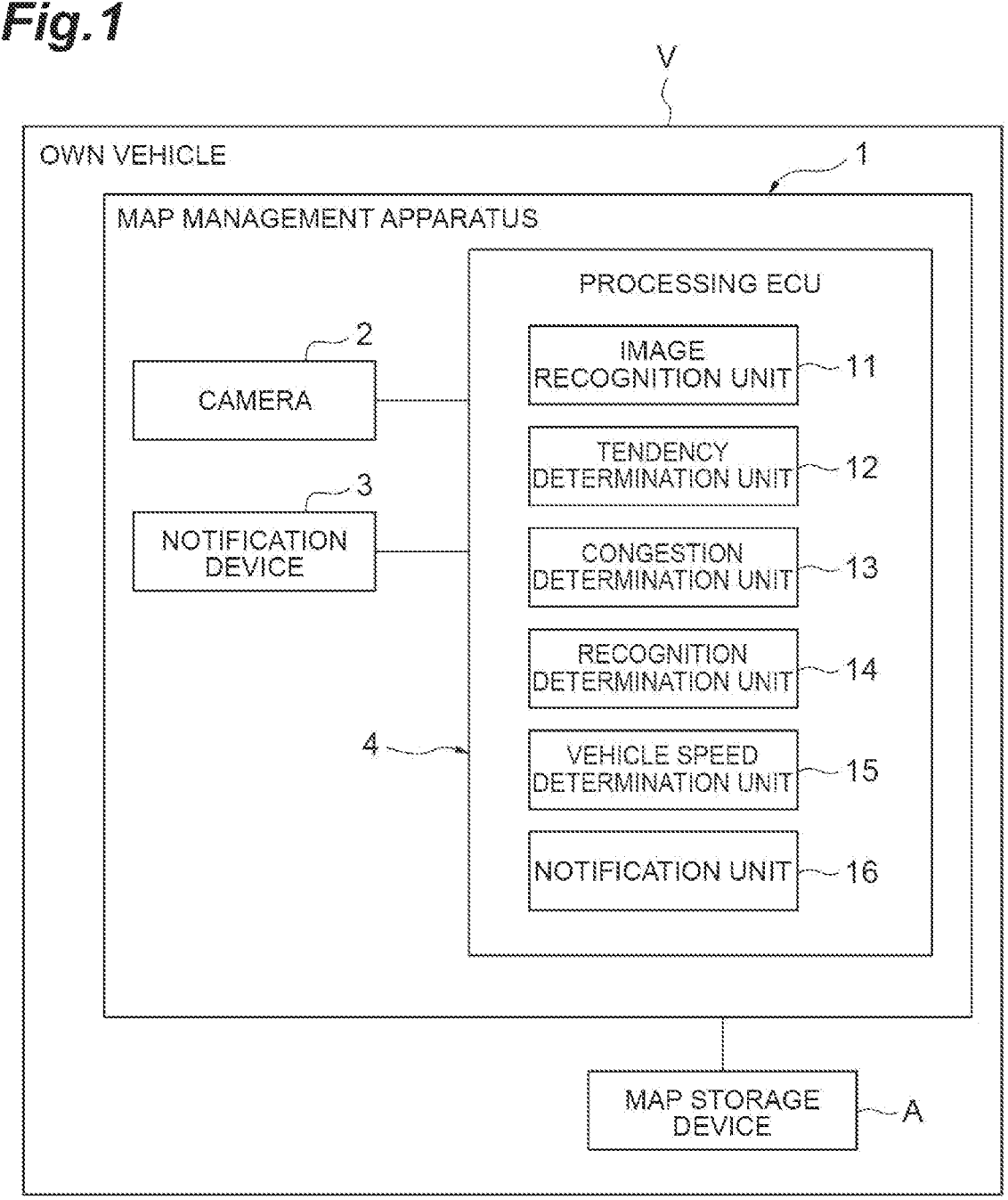
FIG. 1 is a block diagram illustrating an example of a map management apparatus according to an embodiment.

Hereinafter, an exemplary embodiment will be described with reference to the drawings. Note that, in each drawing, the same or corresponding component is denoted with the same reference numeral, and redundant description is omitted.

A map management apparatus 1 illustrated in FIG. 1 issues a notification for prompting update of map information stored in an in-vehicle device of an own vehicle V. The own vehicle V is a vehicle on which a driver can perform a driving operation. The notification for prompting the update of the map information is issued, for example, to an occupant (driver or the like) of the own vehicle V. The occupant who has received this notification updates the map information stored in the in-vehicle device. Alternatively, the occupant who has received the notification requests a dealer of the own vehicle V or the like to update the map information. Note that the map information stored in the in-vehicle device may be used for various controls, for example, route guidance of the own vehicle V, control of traveling of the own vehicle V, or the like. In the present embodiment, the map information is stored (stored) in a map storage device A as the in-vehicle device.

The map information stored in the map storage device A includes road information including a road shape and a road type and speed sign information. Note that the road type may include, for example, a type such as an ordinary road and a highway. The speed sign information is information regarding a speed sign provided on a road.

The map management apparatus 1 includes an in-vehicle camera 2, a notification device 3, and a processing electronic control unit (ECU) 4. The in-vehicle camera 2 is a camera that can image surroundings of the own vehicle V. The notification device 3 is a device that issues various notifications (notification) to the occupant of the own vehicle V. As the notification device 3, for example, a monitor provided on a meter panel or the like may be used.

The processing ECU 4 is an electronic control unit that includes a central processing unit (CPU), a read only memory (ROM), a random access memory (RAM), or the like. The processing ECU 4 implements various functions, for example, by loading a program recorded in the ROM into the RAM and executing the program loaded into the RAM by the CPU. The processing ECU 4 may include a plurality of electronic units. The processing ECU 4 functionally includes an image recognition unit (recognition unit) 11, a tendency determination unit (third determination unit) 12, a congestion determination unit (fourth determination unit) 13, a recognition determination unit (first determination unit) 14, a vehicle speed determination unit (second determination unit) 15, and a notification unit 16.

The image recognition unit 11 recognizes at least any one of a road shape of a road where the own vehicle V travels, a road type of the road where the own vehicle V travels, and a speed sign provided on the road where the own vehicle V travels, on the basis of a captured image imaged by the in-vehicle camera 2. The image recognition unit 11 can recognize various types of information from the captured image, on the basis of a known image processing technology. For example, the image recognition unit 11 can recognize the road type, on the basis of a recognition result of a sign provided on the road (color of sign, speed indicated by speed sign, or the like). Note that, in the present embodiment, the image recognition unit 11 recognizes at least the speed sign on the basis of the captured image. The tendency determination unit 12 determines a tendency of the driving operation of the own vehicle V by the driver. Here, the tendency determination unit 12 determines a tendency of a speed operation of the own vehicle V by the driver. Specifically, the tendency determination unit 12 determines whether or not a difference between a speed indicated by the speed sign recognized by the image recognition unit 11 and an average speed of the own vehicle V is within a predetermined first speed threshold. Furthermore, the tendency determination unit 12 determines whether or not a difference between speed sign information included in the map information and the average speed of the own vehicle V is within the first speed threshold. The first speed threshold may be, for example, 10 km/h. Furthermore, as a speed of the own vehicle V, a detection result of a vehicle speed sensor provided in the own vehicle V or the like may be used.

In this way, the tendency determination unit 12 determines whether or not the driver habitually makes the own vehicle V travel at a higher speed or a lower speed than the speed of the recognized speed sign or the speed of the speed sign information included in the map information or whether or not the driver make the own vehicle V travel at substantially the same speed as the speed of the recognized speed sign or the speed of the speed sign information included in the map information.

The congestion determination unit 13 determines whether or not the own vehicle V is traveling on a congested road. Specifically, the congestion determination unit 13 determines whether or not a state where the speed of the own vehicle V is equal to or less than a predetermined second speed threshold is continued for a predetermined period determined in advance. The second speed threshold may be, for example, km/h.

The recognition determination unit 14 determines whether or not there is a difference between recognition information recognized by the image recognition unit 11 and the map information stored in the map storage device A. This recognition information includes information regarding at least any one of the road shape, the road type, and the speed sign recognized by the image recognition unit 11. When there is a difference between the recognition information and the map information, it can be said that it is necessary to update the map information.

The vehicle speed determination unit 15 determines whether or not there is a difference between the speed of the own vehicle V and the speed sign information included in the map information stored in the map storage device A. When there is the difference between the speed of the own vehicle V and the speed sign information included in the map information, it can be said that there is a possibility that it is necessary to update the map information. More specifically, the vehicle speed determination unit 15 determines whether or not there is the difference, in consideration of the speed indicated by the speed sign recognized by the image recognition unit 11.

Here, when the speed of the own vehicle V is closer to the speed indicated by the speed sign recognized by the image recognition unit 11 than the speed indicated by the speed sign information included in the map information, the vehicle speed determination unit 15 determines that there is the difference between the speed of the own vehicle V and the speed sign information included in the map information. That is, here, the vehicle speed determination unit 15 determines whether or not the map information has an error.

Note that there is a case where the difference between the speed of the own vehicle V and the speed indicated by the speed sign recognized by the image recognition unit 11 exceeds a predetermined third speed threshold. In this case, even if the speed of the own vehicle V is closer to the speed indicated by the speed sign recognized by the image recognition unit 11 than the speed indicated by the speed sign information, the vehicle speed determination unit 15 does not determine that there is the difference between the speed of the own vehicle V and the speed sign information included in the map information. The third speed threshold may be, for example, 10 km/h. That is, here, the vehicle speed determination unit 15 excludes a case of temporary overspeed or deceleration.

The notification unit 16 counts the number of times when the recognition determination unit 14 determines that there is the difference and the vehicle speed determination unit 15 determines that there is the difference. When the counted number of times is equal to or more than a predetermined determination frequency threshold, the notification unit 16 issues a notification for prompting update of the map information using the notification device 3.

Note that the tendency determination unit 12 may determine that the difference is not within the first speed threshold. In this case, even if the recognition determination unit 14 determines that there is the difference and the vehicle speed determination unit 15 determines that there is the difference, the notification unit 16 does not count the number of times. That is, the notification unit 16 excludes a case of habitual overspeed or deceleration from a number-of-times count target.

Furthermore, the congestion determination unit 13 may determine that a state where the speed of the own vehicle V is equal to or less than the second speed threshold is continued for a predetermined period. In this case, even if the recognition determination unit 14 determines that there is the difference and the vehicle speed determination unit 15 determines that there is the difference, the notification unit 16 does not count the number of times. That is, the notification unit 16 excludes a case of a congestion from the number-of-times count target.

Each determination and processing of the tendency determination unit 12 to the notification unit 16 described above are repeatedly executed while an ignition of the own vehicle V is in an ON state. When the counted number of times is equal to or more than the determination frequency threshold, for example, when the ignition of the own vehicle V is brought into the ON state next, the notification unit 16 may issue the notification for prompting the update of the map information using the notification device 3. The number of times counted by the notification unit 16 may be reset, for example, when the map information is updated.

Figure 2:
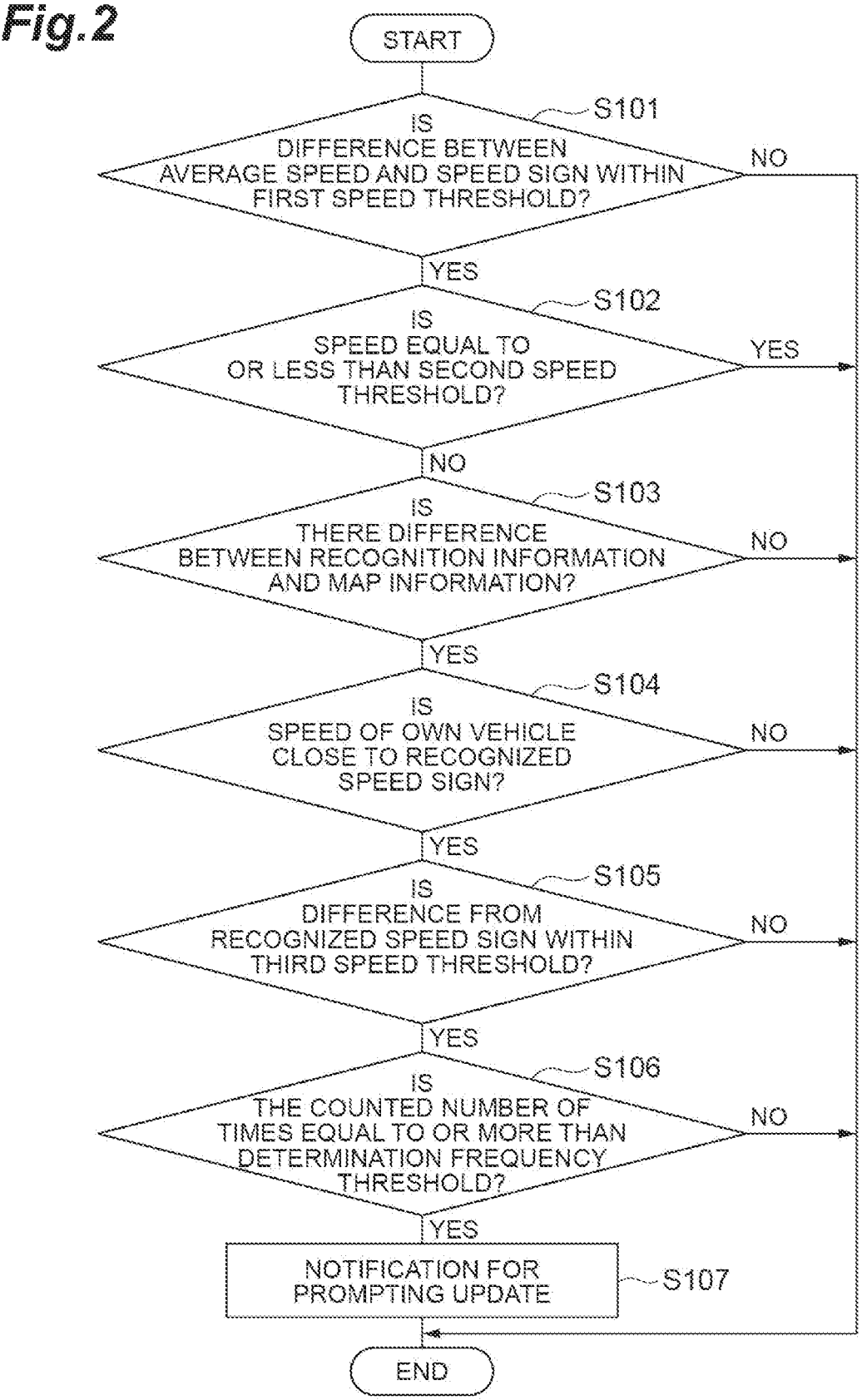
FIG. 2 is a flowchart illustrating a flow of update notification processing of map information executed by the map management apparatus.

Next, a flow of update notification processing of the map information executed by the map management apparatus 1 will be described. Note that a flowchart illustrated in FIG. 2 starts when the ignition of the own vehicle V is brought into the ON state. Furthermore, when the processing ends, the processing starts from the start again after a predetermined time. As illustrated in FIG. 2, the tendency determination unit 12 determines whether or not the difference between the speed indicated by the speed sign recognized by the image recognition unit 11 and the average speed of the own vehicle V is within the first speed threshold or whether or not the difference between the speed sign information included in the map information and the average speed of the own vehicle V is within the first speed threshold (S101). That is, the tendency determination unit 12 determines a tendency of an operation of the speed of the own vehicle V by the driver.

When a determination condition in S101 is not satisfied (S101: NO), the map management apparatus 1 starts processing from S101 again after a predetermined time. When the determination condition in S101 is satisfied (S101: YES), the congestion determination unit 13 determines whether or not the state where the speed of the own vehicle V is equal to or less than the second speed threshold is continued for the predetermined period (S102). That is, the congestion determination unit 13 determines whether or not the own vehicle V is traveling on a congested road. When a determination condition in S102 is satisfied (S102: YES), the map management apparatus 1 starts the processing from S101 again after the predetermined time.

When the determination condition in S102 is not satisfied (S102: NO), the recognition determination unit 14 determines whether or not there is the difference between the recognition information recognized by the image recognition unit 11 and the map information stored in the map storage device A (S103). That is, the recognition determination unit 14 determines the freshness (whether or not information is new) of the map information. When a determination condition in S103 is not satisfied (S103: NO), the map management apparatus 1 starts the processing from S101 again after the predetermined time.

When the determination condition in S103 is satisfied (S103: YES), the vehicle speed determination unit 15 determines whether or not the speed of the own vehicle V is closer to the speed indicated by the speed sign recognized by the image recognition unit 11 than the speed indicated by the speed sign information included in the map information (S104). That is, the vehicle speed determination unit 15 determines whether or not the map information has an error. When a determination condition in S104 is not satisfied (S104: NO), the map management apparatus 1 starts the processing from S101 again after the predetermined time.

When the determination condition in S104 is satisfied (S104: YES), the vehicle speed determination unit 15 determines whether or not the difference between the speed of the own vehicle V and the speed indicated by the speed sign recognized by the image recognition unit 11 is within the predetermined third speed threshold (S105). That is, the vehicle speed determination unit 15 makes a determination so as to exclude a case of the temporary overspeed or deceleration. When a determination condition in S105 is not satisfied (S105: NO), this is considered as a case of the temporary overspeed or deceleration. In this case, the map management apparatus 1 starts the processing from S101 again after the predetermined time.

In a case where the determination condition in S105 is satisfied (S105: YES), the vehicle speed determination unit 15 determines that there is the difference between the speed of the own vehicle V and the speed sign information included in the map information. Then, the notification unit 16 counts the number of times when the recognition determination unit 14 determines that there is the difference and the vehicle speed determination unit 15 determines that there is the difference (S106). That is, the notification unit 16 counts the number of times when the processing reaches the processing in S106. When the counted number of times is not equal to or more than the determination frequency threshold (S106: NO), the map management apparatus 1 starts the processing from S101 again after the predetermined time.

When the counted number of times is equal to or more than the determination frequency threshold (S106: YES), the notification unit 16 issues the notification for prompting the update of the map information using the notification device 3 (S107).

As described above, when the number of times when the recognition determination unit 14 determines that there is the difference and the vehicle speed determination unit 15 determines that there is the difference is equal to or more than the determination frequency threshold, the notification unit 16 issues the notification for prompting the update of the map information. That is, when the number of times when the recognition result (recognition information) of the image recognition unit 11 and the stored map information are different and the stored map information and the speed of the own vehicle V do not match is equal to or more than the determination frequency threshold, the notification unit 16 issues the notification for prompting the update. In this way, the map management apparatus 1 determines whether or not the notification is needed on the basis of the recognition result (recognition information) of the image recognition unit 11, the stored map information, and the speed of the own vehicle V. As a result, the map management apparatus 1 can accurately determine whether or not it is necessary to update the map information and issue the notification for prompting the update.

The tendency determination unit 12 determines whether or not the driver habitually makes the own vehicle V travel at the higher speed or lower speed than the recognized speed sign or the speed of the speed sign information included in the map information. In a case of the habitual overspeed or determination, the notification unit 16 does not count the number of times if the recognition determination unit 14 and the vehicle speed determination unit 15 determine that there is the difference. As a result, the map management apparatus 1 can prevent erroneous determination indicating that it is necessary to update the map information due to the tendency of the speed operation by the driver.

The congestion determination unit 13 determines whether or not the state where the speed of the own vehicle V is equal to or less than the second speed threshold is continued for the predetermined period. That is, the congestion determination unit 13 determines whether or not the own vehicle V is traveling on a congested road. When the road is congested, it is likely to be difficult to travel at a speed in accordance with the road sign. Therefore, when the own vehicle V travels on the congested road, the notification unit 16 does not count the number of times if the recognition determination unit 14 and the vehicle speed determination unit 15 determine that there is the difference. As a result, the map management apparatus 1 can prevent the erroneous determination indicating that it is necessary to update the map information, due to the speed of the own vehicle V traveling on the congested road.

When the speed of the own vehicle V is closer to the speed indicated by the speed sign recognized by the image recognition unit 11 than the speed indicated by the speed sign information included in the map information, the vehicle speed determination unit 15 determines that there is the difference between the speed of the own vehicle V and the speed sign information included in the map information. That is, here, the vehicle speed determination unit 15 determines whether or not the map information has an error. As a result, the map management apparatus 1 can accuracy determine whether or not it is necessary to update the map information.

Furthermore, there is a case where the difference between the speed of the own vehicle V and the speed indicated by the speed sign recognized by the image recognition unit 11 exceeds the third speed threshold. In this case, even if the speed of the own vehicle V is closer to the speed indicated by the speed sign recognized by the image recognition unit 11 than the speed indicated by the speed sign information, the vehicle speed determination unit 15 does not determine that there is the difference between the speed of the own vehicle V and the speed sign information included in the map information. That is, here, the vehicle speed determination unit 15 excludes a case of the temporary overspeed or deceleration from a determination target. As a result, the map management apparatus 1 can accurately determine whether or not it is necessary to update the map information, excluding an effect of the temporary overspeed or deceleration.

In this way, by making a determination based on the plurality of conditions, the map management apparatus 1 can prevent an erroneous determination when the image recognition unit 11 erroneously recognizes the speed sign, when a congestion occurs, due to the tendency of the speed operation by the driver, or the like. As a result, the map management apparatus 1 can accurately determine whether or not it is necessary to update the map information and issue a notification at a timing when update is needed.

Although the embodiment of the present disclosure has been described above, the present disclosure is not limited to the above embodiment. For example, the map management apparatus 1 may issue the notification of the update of the map information, in cooperation with a map management center installed outside the own vehicle V. Note that the map management center stores map information including information regarding a newly constructed road. The map management center can communicate with the map management apparatus 1 mounted on the own vehicle V by wireless communication. Furthermore, the map management apparatus 1 further includes a communication unit that transmits and receives information to and from the map management center.

A flow of processing when the map management apparatus 1 issues the notification of the update of the map information in cooperation with the map management center will be described with reference to the flowchart in FIG. 3. Note that, in the flowchart illustrated in FIG. 3, processing in S105A to processing in S105C are added to the flowchart illustrated in FIG. 2. Processing content of each step other than S105A to S105C is similar to the processing content illustrated in FIG. 2. Therefore, the processing content of S105A to S105C will be mainly described.

As illustrated in FIG. 3, when the determination condition in S105 is satisfied (S105: YES), the communication unit provided in the map management apparatus 1 transmits information to the map management center (S105A). Here, the communication unit can transmit information, for example, a determination result in S105 (speed of own vehicle V, recognition result of speed sign recognized from captured image) or the like, to the map management center. As a result, the map management center can process information such as whether or not it is determined at which point and how much difference is caused between an actual road condition and the stored map information, for example, on the basis of the information acquired from the map management apparatus 1. After the information has been transmitted, the notification unit 16 executes processing in S106.

When the determination condition in S105 is not satisfied (S105: NO), the communication unit provided in the map management apparatus 1 transmits the information to the map management center as in the processing in S105A (S105B). After the information has been transmitted, the communication unit acquires information indicating whether or not a road is newly constructed, from the map management center. Here, when the determination condition in S105 is not satisfied may be assumed as when the difference in the speed exceeds the third speed threshold (10 km/h as an example) and the road type is changed in the first place. For example, as the change in the road type, when an ordinary road has been originally provided, the ordinary road does not exist any longer, and a highway or a bypass road with a high speed range is newly provided, or the like is exemplified. That is, when a road is newly provided, it is necessary to update the map information stored in the map storage device A.

The notification unit 16 determines whether or not the information acquired by the communication unit is information indicating that a road is newly provided (S105C). When the information is the information indicating that the road is newly provided (S105C: YES), the notification unit 16 executes the processing in S106. When the information is not the information indicating that the road is newly provided (S105C: NO), the map management apparatus 1 starts the processing from S101 again after the predetermined time.

In this way, the map management apparatus 1 determines whether or not it is necessary to update the map information using the information, from the map management center, indicating whether or not the road is newly provided. As a result, when the difference between the speed of the own vehicle V and the speed indicated by the recognized speed sign exceeds the third speed threshold, the map management apparatus 1 can determine whether the difference is due to the temporary overspeed or deceleration or due to new construction of the road. As a result, the map management apparatus 1 can accurately determine whether or not it is necessary to update the map information and issue the notification for prompting the update.

Furthermore, when the map management apparatus 1 cooperates with the map management center, for example, when issuing the notification for prompting the update of the map information, the notification unit 16 may notify a specific name of an update target region if the region can be specified. For example, the notification unit 16 can make a display such as "Update of map information in ∘∘ region is recommended from travel data so far. Please check stores or dealers near you or our website." or the like. Furthermore, when issuing the notification for prompting the update of the map information, the notification unit 16 may also notify the number of times when it is determined that there is a difference, an improvement cost improved by the update, or the like. For example, the notification unit 16 can also make a display such as "The update may improve the display of the speed limit by 30%".

As another example, the image recognition unit 11 may recognize a stop sign instead of the speed sign. When there is a stop sign, the speed of the own vehicle V is temporarily zero km/h. That is, the stop sign defines the speed of the own vehicle V, and the stop sign can be similarly used as the speed sign. As a result, the map management apparatus 1 may determine whether or not it is necessary to update the map information, using a recognition result of the stop sign instead of the speed sign.

What is claimed is:

1. A map management apparatus that includes road information including a road shape and a road type and speed sign information and issues a notification for prompting update of map information stored in an in-vehicle device of an own vehicle, the map management apparatus comprising:
    an electronic control unit configured to:
        recognize at least any one of a road shape of a road where the own vehicle travels, a road type of the road where the own vehicle travels, and a speed sign provided on the road where the own vehicle travels, on the basis of a captured image of an in-vehicle camera that images surroundings of the own vehicle;
        recognize at least the speed sign on the basis of the captured image;
        determine whether or not there is a first difference between recognition information including information regarding at least any one of the recognized road shape, the recognized road type, and the recognized speed sign and the map information;
        determine whether or not there is a second difference between a speed of the own vehicle and the speed sign information included in the map information;
        issue a notification for prompting update of the map information, when a number of times when the determination is that there is the first difference and the determination is that there is the second difference becomes equal to or more than a predetermined determination frequency threshold;
        determine whether or not a third difference between a speed indicated by the recognized speed sign and an average speed of the own vehicle is within a predetermined first speed threshold or whether or not a fourth difference between the speed sign information included in the map information and the average speed of the own vehicle is within the predetermined first speed threshold, when the determination is that the third difference is not within the predetermined first speed threshold, even when the determination is that there is the first difference and the second difference, the electronic control unit does not count the number of times;
        determine a tendency of a speed operation of the own vehicle by determining whether or not the third difference is within the predetermined first speed threshold and by determining whether or not there the third difference is within the predetermined first speed threshold; and
        determine whether or not the own vehicle is habitually operated to travel at a higher speed or a lower speed than the speed of the recognized speed sign or the speed of the speed sign information included in the map information or whether or not the own vehicle travels at substantially the same speed as the speed of the recognized speed sign or the speed of the speed sign information included in the map information.

2. The map management apparatus according to claim 1, wherein the electronic control unit is further configured to:
    determine whether or not a state where the speed of the own vehicle is equal to or less than a predetermined second speed threshold is continued for a predetermined period determined in advance,
    wherein when the determination is that the state where the speed of the own vehicle is equal to or less than the predetermined second speed threshold is continued for the predetermined period, even when there is the determination of the first difference and there is determination of the second difference, the electronic control unit does not count the number of times.

3. The map management apparatus according to claim 1, wherein the electronic control unit is further configured to:
    when the speed of the own vehicle is closer to a speed indicated by the recognized speed sign than the speed indicated by the speed sign information included in the map information, determine that there is a fifth difference between the speed of the own vehicle and the speed sign information included in the map information.

4. The map management apparatus according to claim 3, wherein when a sixth difference between the speed of the own vehicle and the speed indicated by the recognized speed sign exceeds a predetermined third speed threshold, even when the speed of the own vehicle is closer to the speed indicated by the recognized speed sign than the speed indicated by the speed sign information, the electronic control unit is configured to not determine that there is a difference between the speed of the own vehicle and the speed sign information included in the map information.

5. A map management apparatus that includes road information including a road shape and a road type and speed sign information and issues a notification for prompting update of map information stored in an in-vehicle device of an own vehicle, the map management apparatus comprising:
    an electronic control unit configured to:
        recognize at least any one of a road shape of a road where the own vehicle travels, a road type of the road where the own vehicle travels, and a speed sign provided on the road where the own vehicle travels, on the basis of a captured image of an in-vehicle camera that images surroundings of the own vehicle;
        determine whether or not there is a first difference between recognition information including information regarding at least any one of the recognized road shape, the recognized road type, and the recognized speed sign and the map information;
        determine whether or not there is a second difference between a speed of the own vehicle and the speed sign information included in the map information;
        issue a notification for prompting update of the map information, when a number of times when the determination is that there is the first difference and the determination that there is the second difference becomes equal to or more than a predetermined determination frequency threshold;

determine whether or not a state where the speed of the own vehicle is equal to or less than a predetermined speed threshold is continued for a predetermined period determined in advance, when the determination is that the state where the speed of the own vehicle is equal to or less than the predetermined speed threshold is continued for the predetermined period, even when the determination is that there is the first difference and the determination that there is the second difference, the electronic control unit does not count the number of times;

determine a tendency of a speed operation of the own vehicle by determining whether or not the state where the speed of the own vehicle is within the predetermined speed threshold; and determine whether or not the own vehicle is habitually operated to travel at a higher speed or a lower speed than the speed of the recognized speed sign or the speed of the speed sign information included in the map information or whether or not the own vehicle travels at substantially the same speed as the speed of the recognized speed sign or the speed of the speed sign information included in the map information.

6. A map management apparatus that includes road information including a road shape and a road type and speed sign information and issues a notification for prompting update of map information stored in an in-vehicle device of an own vehicle, the map management apparatus comprising:

an electronic control unit configured to:

recognize at least any one of a road shape of a road where the own vehicle travels, a road type of the road where the own vehicle travels, and a speed sign provided on the road where the own vehicle travels, on the basis of a captured image of an in-vehicle camera that images surroundings of the own vehicle;

recognize at least the speed sign on the basis of the captured image;

determine whether or not there is a first difference between recognition information including information regarding at least any one of the recognized road shape, the recognized road type, and the recognized speed sign and the map information;

determine whether or not there is a second difference between a speed of the own vehicle and the speed sign information included in the map information;

issue a notification for prompting update of the map information, when a number of times when the determination is that there is the first difference and the determination that there is the second difference becomes equal to or more than a predetermined determination frequency threshold;

when the speed of the own vehicle is closer to a speed indicated by the recognized speed sign than the speed indicated by the speed sign information included in the map information, determine that there is a third difference between the speed of the own vehicle and the speed sign information included in the map information;

when a fourth difference between the speed of the own vehicle and the speed indicated by the recognized speed sign exceeds a predetermined third speed threshold, even when the speed of the own vehicle is closer to the speed indicated by the recognized speed sign than the speed indicated by the speed sign information, the electronic control unit does not determine that there is a difference between the speed of the own vehicle and the speed sign information included in the map information;

determine a tendency of a speed operation of the own vehicle by determining whether or not the third difference is within a predetermined first speed threshold and by determining whether or not there the third difference is within the predetermined first speed threshold; and determine whether or not the own vehicle is habitually operated to travel at a higher speed or a lower speed than the speed of the recognized speed sign or the speed of the speed sign information included in the map information or whether or not the own vehicle travels at substantially the same speed as the speed of the recognized speed sign or the speed of the speed sign information included in the map information.

* * * * *